United States Patent [19]

Shiga

[11] Patent Number: 4,961,081
[45] Date of Patent: Oct. 2, 1990

[54] INK FEEDING MECHANISM FOR INK JET PRINTERS

[75] Inventor: Norio Shiga, Hachioji, Japan

[73] Assignee: Juki Corporation, Tokyo, Japan

[21] Appl. No.: 214,333

[22] Filed: Jul. 1, 1988

[30] Foreign Application Priority Data

Jul. 8, 1987 [JP] Japan .................. 62-105075[U]
Jul. 31, 1987 [JP] Japan .................. 62-118550[U]

[51] Int. Cl.$^5$ .................. G01D 15/16; B41J 2/15
[52] U.S. Cl. .................. 346/140 R; 221/298
[58] Field of Search .......... 346/140 PD, 140 R, 1.1; 221/298, 299, 301

[56] References Cited

U.S. PATENT DOCUMENTS

1,327,058 1/1920 Ogden .
2,773,496 12/1956 Czarnecki .
3,773,069 11/1973 Rebentisch .
4,423,828 1/1984 Tanaka .................. 221/298
4,593,292 6/1986 Lewis .................. 346/1.1
4,636,803 1/1987 Mikalsen .................. 346/1.1
4,667,206 5/1987 DeYoung .................. 346/1.1

Primary Examiner—Mark J. Reinhart
Attorney, Agent, or Firm—Morgan & Finnegan

[57] ABSTRACT

Pellets of solid ink are stored in a row vertically in an ink holder of an ink jet printer. The pellets are supplied one-by-one as needed by action of a stopper which supports the pellet stored at the bottom of the holder, and a presser which presses the pellet stored next to the bottom pellet, working together in association with the action of a solenoid. A seal cover, provided at the inlet of an ink container, normally shuts out leaking chemicals from the liquified ink and opens only when the solid ink falls. Deterioration of the liquified ink is thereby prevented. The open-close action of the seal cover is associated with the solenoid action.

8 Claims, 8 Drawing Sheets

(PRIOR ART)

INK FEEDING MECHANISM FOR INK JET PRINTERS

BACKGROUND OF THE INVENTION

The invention relates to an ink feeding mechanism for ink jet printers wherein solid ink is delivered as needed and is liquified by heat to be jettable against paper to print a character.

Figure 8:
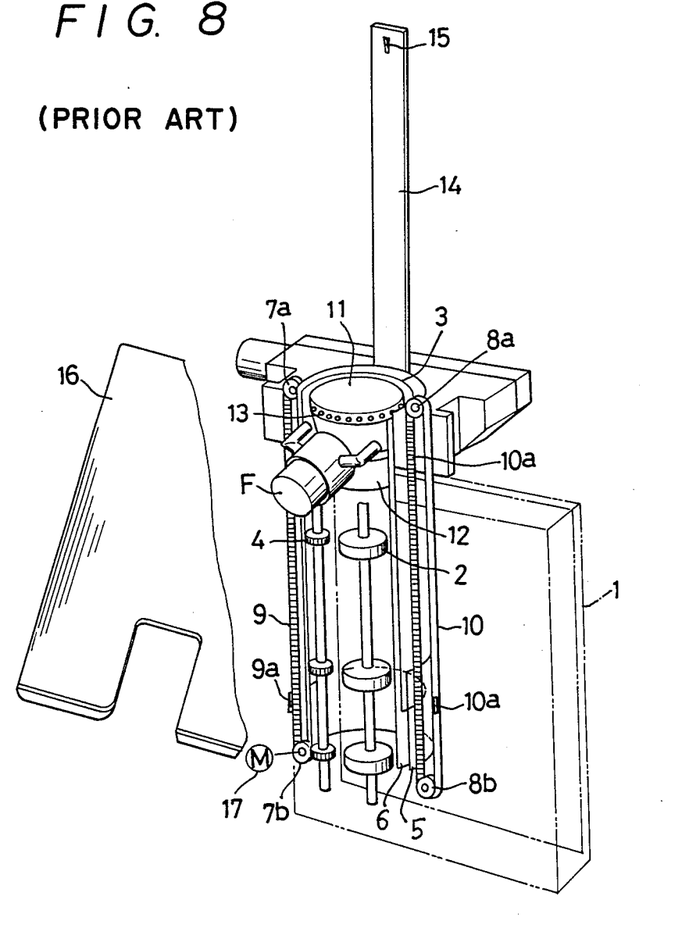
FIG. 8 is a perspective internal view of a conventional "rotary-head type" ink jet printer mechanism.

Referring to FIG. 8, one conventional rotary-type ink jet printer, in which paper is fed in a vertical direction, will be explained. A paper cassette 1 is set vertically, and the paper is pressed by a pressing device (not shown) from the back side against a pick-up roller 2. When the pick-up roller 2 is rotated by a driving source (not shown) driven by an electric signal, a sheet of paper 3 is drawn by the pick-up roller 2, and is transfered between an insert roller (not shown) and a presser roller 4 and further between an outer shell 5 and an inner shell 6. Then, the paper 3 is transfered vertically by endless synchronized belts 9, 10 which are driven by driving pulleys 7a, 7b and 8a, 8b respectively. The driving pulley 7a, 7b, 8a, 8b are driven by a paper feed motor 17.

During the vertical movement of the paper, print head 11 of the ink jet printer rotates and jets ink from a nozzle 13 such that printing is conducted.

The print head 11 is rotated by a motor 12, and provides a plurality of nozzles 13 around the periphery of the print head 11.

A symbol F denotes a small fan to supply air to the paper 3 to quickly dry the jetted ink on the paper.

When the paper 3 is raised up to the point where it reaches a deflector 15, the lower portion of the paper 3 separates from the synchronized belts 9, 10, and, as a result, the paper 3 falls on a tray 16.

Figure 9:
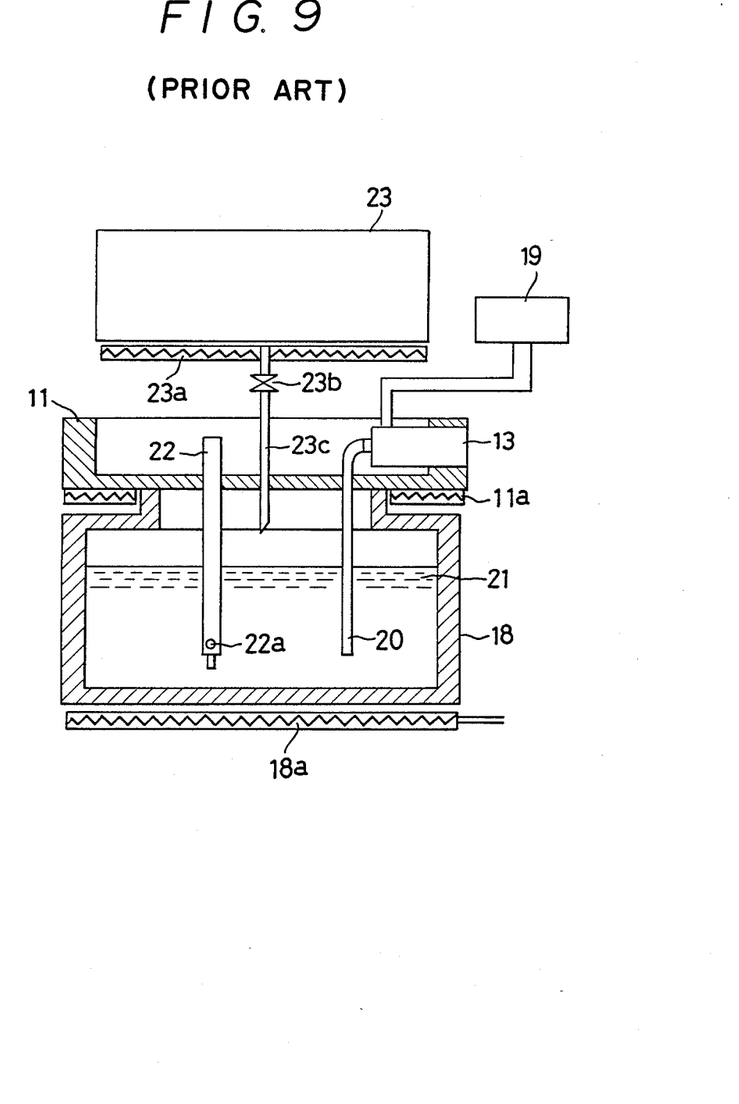
FIG. 9 is a sectional side view of a print head of a conventional "rotary-head type" ink jet printer.

Referring to FIG. 9, an essential part of the print head 11 will be explained. A plurality of nozzles 13 are located at the periphery of the print head 11. An ink container 18 is located in a lower portion of the print head 11. A pulse generator 19 sends a signal to a piezoelectric element (not shown) provided at the nozzle 13 such that the nozzle 13 pumps up ink 21 through a feeder tube 20 and jets the ink to the paper 3 (FIG. 8) to print the required character.

An ink supply reservoir 23, wherein the solid ink is liquified, is positioned above the container 18. A rod-like level detector 22 is provided in the container 18. The level detector 22 provides a thermistor 22a and may be made of a fluorocarbon resin to protect from heat and corrosion.

When an operator puts a solid ink pellet in the reservoir 23, the solid ink will be heated by a heater 23a and be liquified and storaged. The temperature of the liquified ink is maintained at an appropriate level by a thermostat (not shown). When the ink level in the container 18 is lowered, the level detector 22 inputs a signal to a CPU (not shown). The CPU then energizes a solenoid valve 23b to open, such that the liquified ink flows from the reservoir 23 to the container 18.

Typically, ink supply reservoirs 23 are bulky and situated adjacent to the upper side of the print head 11. If four colors, namely black, blue, red, and yellow are required, four reservoirs, each with a heater 23a, a solenoid valve 23b and a feeder tube 23c, are placed in a complicated formation and the operator can face difficulty with the operation and maintenance of the unit.

Besides, since the ink container 18, the print head 11 and the ink supply reservoir 23 are located so closely in a vertical direction, heat from these parts may be accumulated and the parts may tend to be heated up to a higher temperature than desired. Thus, if the printer is operated for many hours, the ink may become deteriorated as the solvents in the ink evaporate and, as a result, the printing quality will be degraded.

Figure 10:
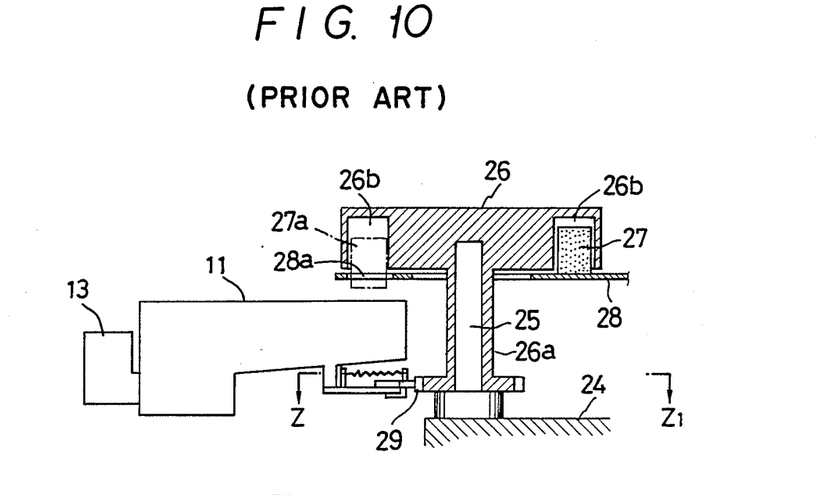
FIG. 10 is a sectional side view of a print head of a conventional "carriage type" ink jet printer.

In a conventional carriage-type ink jet printer, as shown in FIG. 10, a support shaft 25 is provided at a base 24, The base 24 is located beside a print head 11. An ink holder 26, having multiple areas 26b for storing solid ink 27, is placed rotatably on the support shaft 25.

A center portion of the frame 26a of the ink holder 26 is pierced by the support shaft 25. A support plate 28 is located closely under the ink holder 26. The support plate 28 provides a hole 28a such that the solid ink 27 falls down to the print head 11 when the solid ink is overlaped on the hole 28a by rotation of the ink holder 26.

Figure 11:
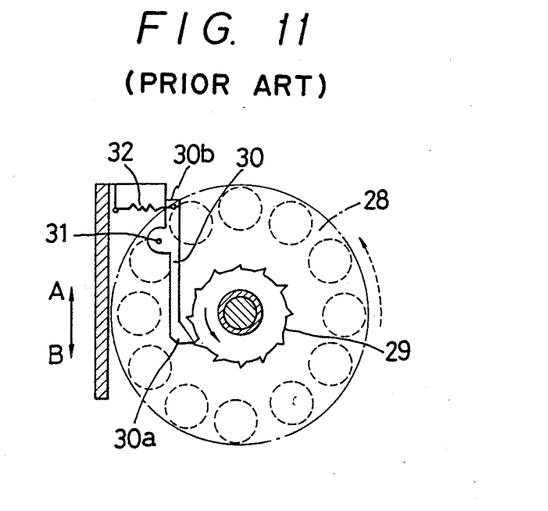
FIG. 11 is a sectional plan viewed in direction of arrow Z-Z' of FIG. 10.

Referring to FIG. 11, which is a plan view of the embodiment of FIG. 10, a sprocket 29 is provided at the lower end of the frame. One end of a lever 30 engages the sprocket 29. The lever 30 is pivoted by a support pin 31 which is attached to the print head 11. The rear end 30b of the lever 30 is pulled by a spring 32 such that the end 30a is urged to always engage with the sprocket 29.

Under the above-described conventional-type of ink feeding mechanism, when the print head 11 moves in direction of arrow A (FIG. 11), the lever 30 moves with the print head 11 but its end 30a will not mesh with the sprocket 29, so the ink holder 26 stays unmoved. On the other hand, when the print head moves in direction of arrow B, the end 30a meshes with the sprocket 29, so the ink holder 26 rotates counter-clockwise.

As the solid ink 27 overlaps on a hole 28a, the solid ink 27 falls into the print head 11 as the dotted-line solid ink 27a shows (FIG. 10).

With such an ink feeding design, if multiple colors (e g., black, blue, red, and yellow) are required, four ink holders 26 are required. However, the solid ink 27 is supplied in response to the movement of the print head 11. Thus, control of the solid ink supply is very difficult.

It is therefore an object of the invention to provide a solid-to-liquid ink printer having an improved solid ink delivery mechanism.

It is a further object of the invention to provide an improved delivery system for solid-ink pellets.

SUMMARY OF THE INVENTION

These and other objects of the invention are met by providing, in one illustrative embodiment wherein an ink jet printer includes a plurality of nozzles located around the periphery of a rotary print head and paper is fed vertically in the direction of the rotational axis of the rotary print head, an ink holder which stores a plurality of solid ink pellets located above the print head, the ink holder providing stoppers which protect the bottom-stored solid ink pellets from falling and also provide a presser which is located above the stopper and tentatively presses the second-to-bottom stored solid ink pellet when the bottom-stored solid ink pellet falls down. Thereby, when the stopper is acted to release the bottom-stored solid ink, the presser simultaneously presses the second solid ink pellet such that the second solid ink pellet is protected from falling down and only the bottom-stored solid ink pellet falls. Additionally, a seal cover may be provided at the inlet of the ink container to protect the leaking out of chemicals in the ink, the cover opening only when the stopper is opened.

BRIEF DESCRIPTION OF THE DRAWINGS

The invention will be described in greater detail below by way of reference to the following drawings, in which.

DETAILED DESCRIPTION OF THE DRAWINGS

According to the present invention, when a solid ink stored vertically in one row in the ink holder falls into the ink container, the stopper and the presser, acting in association with a solenoid, allow only the bottom-stored solid ink pellet to drop, and another solenoid allows the ink holder to be positioned exactly over the ink inlet. Thus, supplying of the solid ink to the ink container is securely performed. Besides, the cap which prevents leaking out of chemical solvents in the ink opens only when the solid ink is to be supplied, thus deterioration of the ink is prevented.

Figure 1:
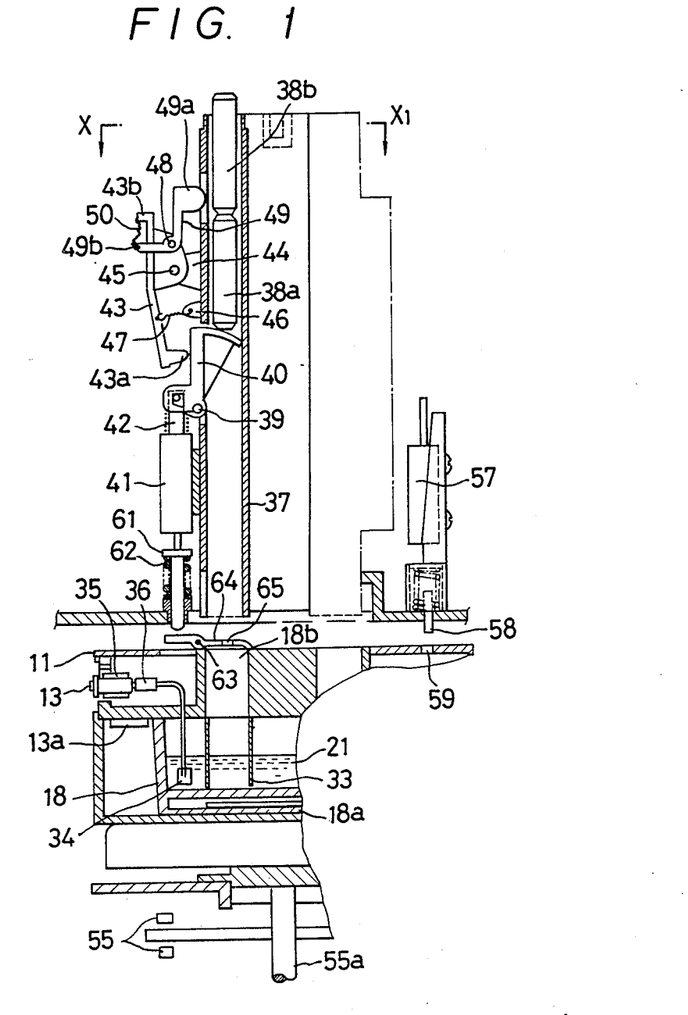
FIG. 1 is a sectional view of a print head and an ink feeding mechanism of an ink jet printer according to one embodiment of the present invention.

Referring to FIG. 1, one preferred embodiment of the present invention will be explained. Numeral 11 denotes a print head, numeral 13 denotes a nozzle, numeral 13a denotes a heater, numeral 18 denotes an ink container, numeral 18a denotes a heater, and numeral 21 denotes ink.

The ink container 18 provides a filter 33 and a nozzle filter 34. Each nozzle 13 provides a piezoelectric element 35 and an adaptor tube. An ink holder 37 is located above the print head 11 and stores solid ink 38a, 38b. The drawing shows only two solid inks 38a 38b, but actually there may be, for example, 7 solid ink pellets stored vertically. Also, the solid ink obviously need not necessarily be in the specific pellet form shown in FIG. 1.

A stopper 40 is rotatably sustained at a fulcrum 39. The stopper 40 is connected to the end of a plunger 42 of a solenoid 41. A presser lever 43 is rotatably sustained by a fulcrum 45 which is provided at a projection 44 projected from the ink holder 37. The tip end 43a of the presser lever 43 is urged to press the stopper 40 by a spring 47 stretched between a projection 46 and the presser lever 47.

A presser 49 is rotably sustained by a fulcrum 48. A spring 50 is stretched between a rear end 43b of the presser lever 43 and the rear end 49b of the presser 49, such that a tip end 49a of the presser 49 will press the solid ink 38b (preferably softly and without damaging the solid ink 38b.)

A seal cover 64 rotatably sustained at a fulcrum 63 is situated at an inlet 18b of a container 18. The seal cover 64 provides a small vent hole 65.

The plunger 42 pierces through the solenoid 41 and its lower end provides a step 61. A spring 62 is inserted to resist against the step 61 when the step 61 descends. Thereby, when the solenoid 41 energizes, the plunger 42 draws, the stopper 40 rotates counter-clockwise, the presser lever 43 rotates clockwise and the presser 49 presses the solid ink 38b softly without damaging the solid ink 38b.

Further, when the plunger 42 draws, the step 61 descends and opens the seal cover 64. Thus, when the stopper 40 rotates counter clockwise, the solid ink 38a falls down into the container 18. However, the solid ink 38b will not fall since the presser 49 rotates clockwise and its tip end 49a presses the solid ink 38b.

Figure 2:
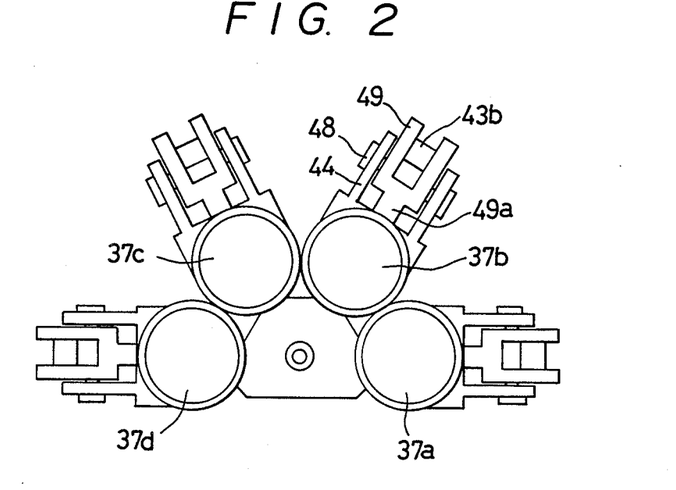
FIG. 2 is a sectional and enlarged plan viewed in direction of arrow X-X' of FIG. 1.
Figure 3:
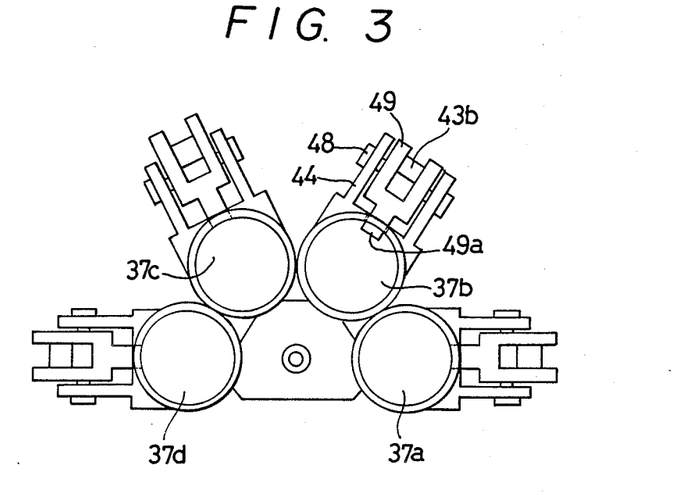
FIG. 3 is a sectional and enlarged plan viewed in direction of arrow Y-Y' of FIG. 7.

Referring to FIG. 2, in a preferred embodiment, the ink holder 37 comprises four stockers namely 37a for black ink, 37b for blue ink, 37c for red ink, and 37d for yellow ink. Referring to FIG. 3, the presser 49 for the blue ink holder 37b is acted upon by the solenoid 41, and its end 49a is pushed into the blue ink holder 37b.

Figure 4:
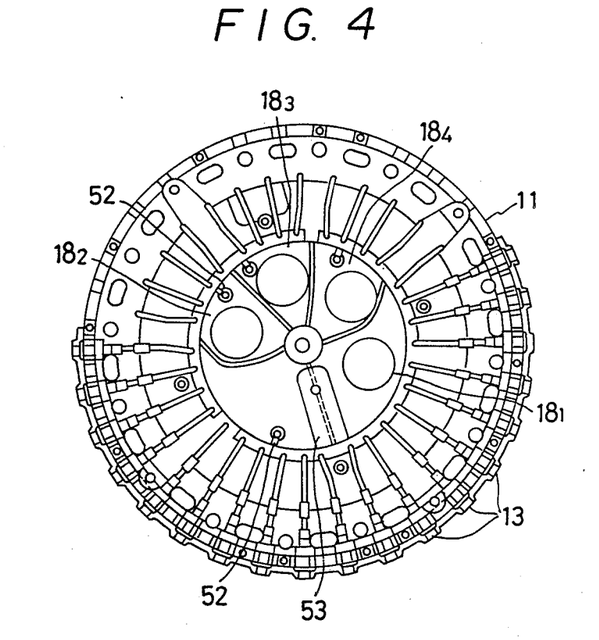
FIG. 4 is a plan view of a print head according to one embodiment of the present invention.

Referring to FIG. 4, which is a plan view of the print head 11, four ink containers $18_1$, $18_2$, $18_3$, $18_4$ (preferably one for each color black, blue, red, and yellow), are provided at the central portion of the print head 11, and the stockers 37a, 37b, 37c, 37d are located at the upper side of these container $18_1$, $18_2$, $18_3$, $18_4$, respectively.

A plurality of nozzles 13 are equally spaced at the periphery of the print head 11. The black ink container $18_1$ provides twenty nozzles, while the other ink containers $18_2$, $18_3$, $18_4$ provide four nozzles each.

Each ink container $18_1$, $18_2$, $18_3$, $18_4$ also preferably provides a level-detector 52 and a thermal fuse 53.

Figure 5:
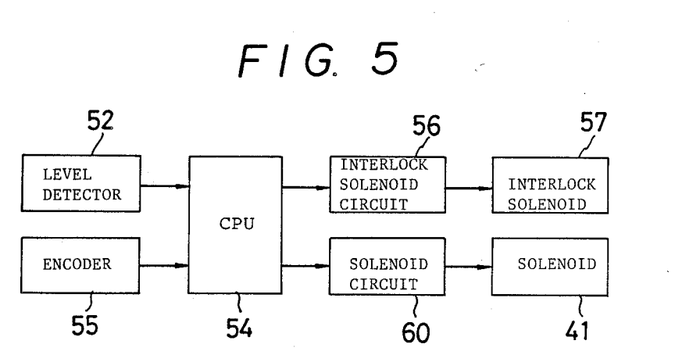
FIG. 5 is a block diagram of a controlling system according to one embodiment of the present invention.

Referring to FIG. 5, which is a control block diagram according to the present invention, at the inlet side of a CPU 54, a level detector 52 and an encoder 55 are connected.

Figure 7:
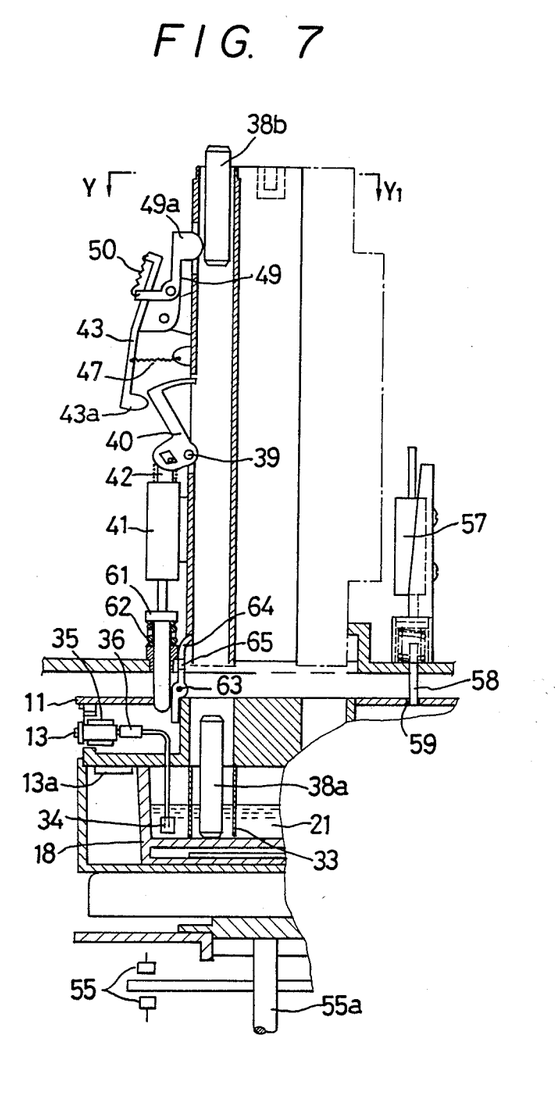
FIG. 7 is a supplementary drawing to FIG. 1 to explain how a solid ink is supplied.

An encoder 55 is installed at a rotation shaft 55a as shown in FIG. 1 and FIG. 7. At output side of the CPU 54, an inter-lock solenoid 57 is connected via an inter-lock solenoid circuit 56, and the solenoid 41 is connected via a solenoid circuit 60. The inter-lock solenoid 57 acts to push a lock pin 58 into a lock hole 58.

Figure 6:
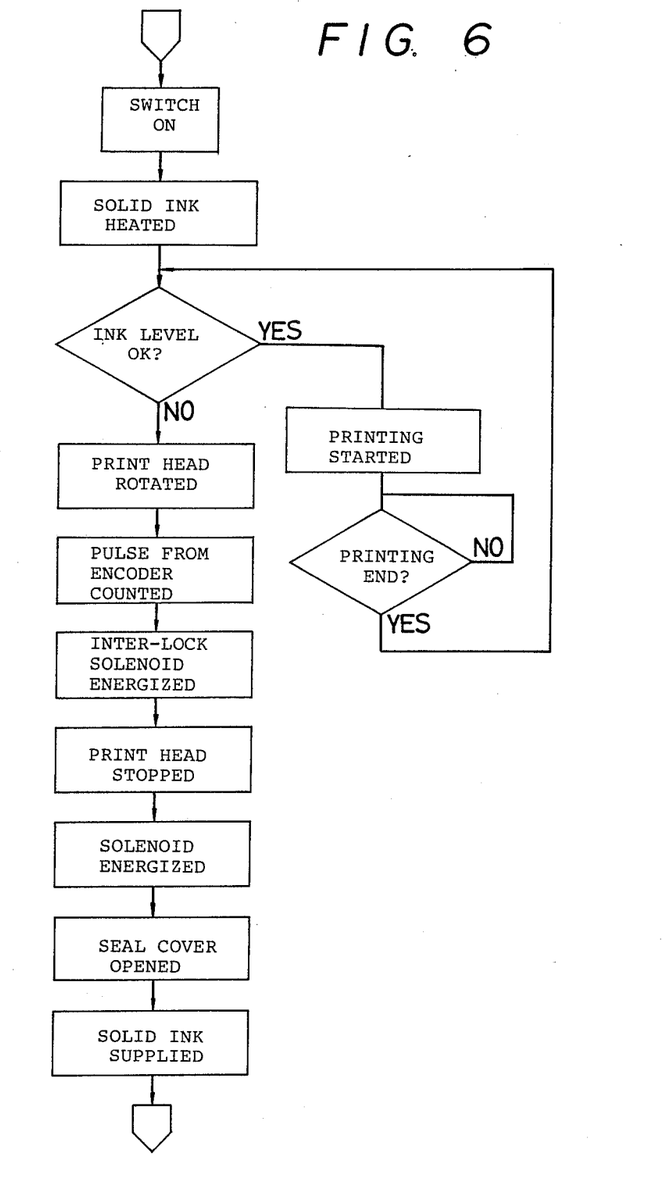
FIG. 6 is a flow chart explaining the operation of the block diagram of FIG. 5.

Referring to FIG. 6, which is a flow chart of one embodiment of the present invention, and FIG. 7, which is an explanatory drawing of the operation of this embodiment, the operation of the present invention will now be explained.

When the electric switch is switched on, the solid ink in the ink container 18 is liquified by a heater. The level of ink stored in the container 18 is detected by the level-detector 52. If the level is adequate, the ink is jetted from the print head 11 and printing starts.

When the ink level becomes low, the print head 11 rotates at a low speed and, counting pulse numbers from the encoder 55, the print head 11 selects a predetermined position. When the print head is positioned at the predetermined position, the interlock solenoid 57 energizes and the lock pin 58 inserts into the lock hole 59. Thus the rotation of the print head is securely stopped.

Then the solenoid 41 energizes, the seal cover 64 opens, and the stopper 40 rotates counter-clockwise. Thereby the bottom-stored solid ink pellet 38a falls into the container 18 while the presser lever 43 rotates clockwise. As a result, the presser 49 presses the solid ink 38b to protect the solid ink 38b from falling down.

When the solenoid 41 de-energizes, the solid ink 38b falls and is stopped by the stopper 40 as the stopper resumes its original position. Thus, the original position of the solid ink as shown in FIG. 1 can be resumed and the seal cover 64 covers the opening 18b.

As aforementioned, according to the present invention, the solid ink 38a will be supplied as needed one by one to the ink container 18 whenever the ink level is lowered to a predetermined level. The seal cover is opened only when the stopper opens, and chemical substances in the liquified ink are thereby prevented from leaking out.

Further, the interlock solenoid 57 acts to push the lock pin 58 into the lock hole 59 such that during the ink supply process, the position of the print head 11 remains unmoved, and the solid ink is securely supplied.

It will, of course, be understood that the invention is not limited to the specific embodiments herein disclosed but should be interpreted only in accordance with the claims which follow.

I claim:

1. In an ink jet printer having an ink holder with solid ink pellets vertically stored therein, an ink feeding mechanism, comprising:
    means for stopping the bottom-stored pellet in the ink holder, said stopping means being retractable to release the bottom-stored pellet;
    pressing means directly responsive to movement of said stopping means for pressing the pellet stored second from the bottom in the ink holder when said stopping means is retracted;
    a presser lever which transmits the movement of said stopping means to said pressing means;
    an actuator which acts to engage and retract said stopping means;
    encoding means provided in association with a print head of said printer to determine the position of an ink container;
    means responsive to said encoding means for positioning said ink container under the ink holder; and
    means for temporarily locking the ink container in position under said ink holder.

2. An ink jet printer, according to claim 1 wherein the ink feeds mechanism comprises:
    a seal cover, having an open-close mechanism, provided at the inlet of said ink container, the open-close mechanism of said seal cover being responsive to the operation of said actuator and opening the cover when said stopping means is re-tracted and closing said cover when said stopping means is engaged.

3. An ink jet printer, as recited in claim 2, in which said actuator is a vertically disposed solenoid and said open-close mechanism comprises:
    an extended plunger of said solenoid which plunger acts to push an end of the seal cover to open said cover; and a spring for maintaining the cover in a closed position when the plunger is retracted.

4. In an ink jet printer having an ink holder with solid ink pellets vertically stored therein, an ink feeding mechanism, comprising:
    a presser movable for pressing the pellet stored second from the bottom in the ink holder;
    a presser lever movable for actuating said presser;
    a stopper upon which a bottom end of the bottom-stored pellet holder rests to stop the same pellet, said stopper being retractable for simultaneously actuating said presser lever and allowing said pellet to drop; and
    an actuator for actuating said stopper.

5. An ink feeding mechanism according to claim 4 further comprising a spring between said presser lever and said presser for resiliently transmitting the movement of said presser lever to said presser.

6. In an ink jet printer having an ink holder with solid ink pellets vertically stored therein, an ink feeding mechanism, comprising:
    presser pivotally mounted on the ink holder for pressing the pellet stored from the bottom in the ink holder;
    a presser lever pivotally mounted on the ink holder for actuating said presser;
    a stopper pivotally mounted on the ink holder upon which a bottom end of the bottom-stored pellet in the holder rests to stop the same pellet, said stopper pivotally retractable for simultaneously actuating said presser lever and allowing said pellet to drop;
    an actuator for actuating said stopper; and
    a spring between said presser lever and said presser for resiliently transmitting the movement of said presser lever to said presser.

7. An ink jet printer having an ink holder with solid ink pellets vertically stored therein, and an ink feeding mechanism, comprising:
    means for stopping the bottom-stored pellet in said ink holder, said stopping means being retractable to release the bottom-stored pellet; pressing means responsive to movement of said stopping means for pressing the pellet stored second from the bottom in the ink holder when said stopping means is retracted;
    a presser lever which transmits the movement of said stopping means to said pressing means;
    an actuator which acts to engage and retract said stopping means; encoding means provided in association with a print head of said printer to determine the position of an ink container;
    means responsive to said encoding means for positioning said ink container under said ink holder;
    means for temporarily locking said ink container in position under said ink holder; and
    a seal cover, having an open-close mechanism, provided at the inlet of said ink container, said open-close mechanism of said seal cover being responsive to the operation of said actuator and opening said cover when said stopping means is retracted and closing said cover when said stopping means is engaged.

8. An ink jet printer having an ink holder with solid ink pellets vertically stored therein as recited in claim 7, wherein said actuator is a vertically disposed solenoid and said open-close mechanism comprises:
    an extended plunger of said solenoid which plunger acts to push an end of the seal cover to open said cover; and
    a spring for maintaining said cover in a closed position when said plunger is retracted.

* * * * *